UNITED STATES PATENT OFFICE 2,238,912

BLEACHING OF CELLULOSE ETHERS

James A. McHard and Floyd C. Peterson, Midland, Mich., assignors to The Dow Chemical Company, Midland, Mich., a corporation of Michigan No Drawing. Application January 17, 1940, Serial No. 314,276

8 Claims. (Cl. 8—108)

This invention relates to a method of bleaching cellulose ethers and particularly to a method for removing final traces of color from freshly prepared cellulose ethers.

Several methods have been proposed heretofore for the purification and clarification of cellulose derivatives. Many of these methods are applicable only to cellulose esters and, of those which have been described for employment with cellulose ethers, many are disadvantageous in that they result in a degradation of the ether product. Methods have been proposed employing numerous of the known bleaching agents, including free chlorine and hypochlorites, to be employed either in a solution of cellulose ethers or in aqueous suspensions thereof. The prior methods of bleaching cellulose ethers in aqueous suspensions have not disclosed the conditions which have now been found necessary to obtain a white product of good stability.

The present invention has for its object the provision of a method of bleaching water-insoluble cellulose ethers under controlled conditions in an aqueous suspension to provide a white product capable of dissolving to form clear colorless solutions in the usual solvents for cellulose ethers. It is another object to provide a method whereby water-insoluble cellulose ethers may be bleached in aqueous suspension with hypochlorites without injuriously affecting the cellulose ether. A particular object is to provide a method whereby pure ethyl cellulose capable of forming colorless solutions and clear haze-free films may be prepared from crude or from partially purified ethyl cellulose without a material degradation or viscosity reduction. Other objects and advantages will become apparent from the following detailed description.

We have now found that the foregoing and related objects may be attained and that water-insoluble cellulose ethers of good color rating may be produced by treating an aqueous slurry of the cellulose ether with a solution of a metal hypochlorite at a temperature in the range from 40° to 80° C. and at a pH between 9 and 11.8. The aqueous suspension of cellulose ether may contain from 1 to 7.5 per cent by weight of cellulose ether and preferably should be of a consistency of about 2 to 4 per cent. The amount of hypochlorite employed, expressed in terms of "available chlorine," should be from 1 to 5 per cent of the weight of the cellulose ether being treated. The duration of the treatment may vary from 15 minutes to 3 hours and usually it is found that the bleaching is satisfactorily completed in from 30 to 50 minutes, more or less. The pH of the reaction mixture is maintained throughout the bleach in the aforesaid range of from 9 to 11.8 and, after bleaching is complete, the hypochlorite is separated from the treated cellulose ether which is then preferably given a brief but thorough washing with acidulated water, at a pH between about 2 and 5, and preferably at a pH of from 2 to 3. This treatment removes the traces of degradation products formed during the bleaching operation and materially improves the color and stability of the cellulose ether. As a final step the product is washed free from all remaining reagents until the wash waters are neutral. The so-treated product, when dissolved in the customary solvents for cellulose ethers, forms clear, colorless solutions from which may be deposited clear, haze-free films.

We have found the above-defined pH range to be critical, since we desire to effect maximum removal of color from the cellulose ethers while the rate of chlorination, and hence, of degradation, is held at a minimum. It has been found that hypochlorite solutions at a pH between 2 and 9 serve both to oxidize and to chlorinate the cellulose ether. Chlorination is evidenced by excessive degradation and viscosity reduction, and causes little, if any, improvement in color. At a pH below 2, hypochlorite solutions contain too little hypochlorite to bleach impurities, and the acid solutions degrade the cellulose ether. We have found, however, that at a pH between 9 and 11.8 there is enough oxidative effect to bleach discoloring impurities without, at the same time, chlorinating or otherwise degrading the cellulose ether. Thus, when using metal hypochlorite solutions at a pH between 9 and 11.8, the ratio of the selective oxidation of impurities to that of chlorination (or degradation) of the cellulose ether is optimum for effecting bleaching without materially altering the viscosity characteristics of the cellulose ether.

The stability of cellulose ethers, referred to herein, is expressed in terms of the per cent retention of viscosity exhibited by the ether when foils thereof are cast from standard solution and heated at 120° C. for 16 hours, then redissolved to form standard solutions.

In a preferred method of carrying out the process of the present invention, from 2 to 4 parts of a water-insoluble cellulose ether, and preferably such an ether in a freshly precipitated form, are suspended in about 100 parts of an aqueous medium containing a metal hypochlorite and having a pH of from 9 to 11.8, the temperature of the suspension being in the range from 40 to 80 degrees. Efficient bleaching occurs in certain narrow pH ranges which are specific for the temperature range employed. Thus, at a temperature of about 40° C., optimum bleaching and minimum degradation occurs in the pH range 9 to 10.3. At 60° C., the preferred pH range is 9.3 to 10.3, and at 70° C. to 80° C., the ratio of the rate of oxidation of impurities to the rate of degradation of ethyl cellulose (or other ethers) is at a maximum in the pH range from 10.5 to 11.8. After a reaction period of from 15 minutes to 3 hours, and normally one of from 30 to 50 minutes, which period varies inversely with the temperature employed, the cellulose ether is separated from the alkaline bleaching liquor, washed preferably with dilute mineral acid solution of a pH of about 2 to about 3 and further washed with water until neutral. The alkaline hypochlorite does not completely remove the oxidized impurities, but these are removed by a brief acid wash as described.

The product obtained is rated according to its color in approximately the following manner. The purified and subsequently dried cellulose ether is dissolved to form a 20 per cent solution in a suitable solvent which, in the case of standard ethoxy ethyl cellulose, may be a mixture of 80 parts of toluene and 20 parts of ethanol by volume, and in the case of medium ethoxy ethyl cellulose may be a mixture of 60 parts of toluene and 40 parts of ethanol by volume. These solutions are compared with standard color solutions similar to but not identical with the Hazen color rating standards (A. S. T. M. Tentative Standards, 1937, Designation D–365–35–T). The approximate relation between our standard color solutions and the Hazen solutions is given by the following table:

| Our color standard No. | Comparable Hazen standard No. |
| --- | --- |
| 1.0 | 1 |
| 2.0 | 2 |
| 3.0 | 5 |
| 4.0 | 7 |
| 4.5 | 9 |

Cellulose ethers having a color rating of 4, or less, by our standard, are satisfactory for most commercial uses, and those of color rating of 2.0, or less, satisfy the most exacting requirements as to clarity of solution and lack of color.

Since the use of elevated temperatures, in the range from 40° to 80° C., results in shortened bleaching time, the method is adaptable to continuous operation. Within the stated temperature range, and at corresponding optimum pH, the higher the temperature of bleaching, the shorter is the time required. It is allowable to overstep the required time somewhat without ill effect, as only a 15 per cent drop in viscosity occurs after 1 hour's bleaching at 75° C. with a hypochlorite solution having pH 11 and containing 3 per cent available chlorine, even though bleaching under these conditions may be complete after 15 to 30 minutes. The bleaching time is further modified, of course, by the amount of discoloring impurities already present, varying inversely therewith, other factors being constant.

A series of bleaching tests was carried out on discolored, crude water-insoluble cellulose ethers, to determine the optimum pH of the reaction medium for removing color without degradation and at the same time to determine the poorest pH, measured by the same standards of color. Several runs were made at 40° C., at 60° C., and at 75° C., and at each temperature numerous check runs were made at various concentrations of cellulose ether in the bleaching slurry and with bleaches varying both as to their available chlorine content and their pH. The results of these tests are summarized and the average results are listed herewith:

| Temperature of bleach | pH of hypochlorite solution for— | | | |
| --- | --- | --- | --- | --- |
| | Minimum color (optimum bleach) | | Maximum color (poorest bleach) | |
| | Range | Ave. | Range | Ave. |
| 40° C. | 9.0–10.3 | 10.1 | 7.5–8 | 7.8 |
| 60° C. | 9.5–11.0 | 10.0 | 7.5–8 | 7.9 |
| 75° C. | 10.6–12.0 | 11.3 | 7.5–8 | 7.9 |

In a specific example, freshly precipitated ethyl cellulose (ethoxy content—48.5 per cent, color—4.5, stability—70) was added continuously to an alkaline solution of sodium hypochlorite (pH 11) in a ratio to form a slurry of about 4 per cent ethyl cellulose. The hypochlorite was of a strength to contain about 3 per cent of "available chlorine," based on the weight of ethyl cellulose being treated. The slurry, at 75° C., was moved forward continuously through a reaction zone for about 30 minutes. The ethyl cellulose was freed from hypochlorite on a centrifugal filter, and washed with distilled water. A sample of this product, when dried, had color—3.0, and stability—80. The bulk of the ethyl cellulose was mixed with fresh water to which was added just enough hydrogen chloride to bring the pH to about 3. The temperature of this washing was about 60° to 80° C. After about 3 to 5 minutes, the ethyl cellulose was again removed from the aqueous medium and washed with fresh water and finally with hot distilled water till the washings were neutral. The ethyl cellulose was dried and had a color rating of 2.3. The intrinsic viscosity of the purified ethyl cellulose was over 85 per cent that of the crude material subjected to treatment. By way of contrast, a sample of the same crude ethyl cellulose, bleached at pH 8 at 75° C. for 30 minutes, and washed as above, had a color rating of 4.5, and a viscosity about 60 per cent that of the crude ether subjected to treatment.

The invention has been illustrated with respect to the bleaching of ethyl cellulose using sodium hypochlorite. Other water-insoluble cellulose ethers, and other hypochlorites, may be employed under the specific conditions herein outlined. Thus, the invention may be applied to the purification of methyl cellulose which is insoluble in the medium employed under the conditions of treatment, propyl cellulose, butyl cellulose, ethyl propyl cellulose, ethyl lauryl cellulose, benzyl cellulose, ethyl benzyl cellulose, and other alkyl, aralkyl and mixed cellulose ethers of the water-insoluble type. Similarly, potassium hypochlorite, and other metal hypochlorites capable of existing in aqueous solution at a pH between 9 and 11.8, may be employed.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:

1. The method of bleaching cellulose ethers which comprises treating an aqueous suspension of a water-insoluble cellulose ether with a solution of an alkali hypochlorite, at a temperature between about 40° and about 80° C., and at a pH between 9 and 11.8.

2. The method of bleaching cellulose ethers which comprises treating an aqueous suspension of a water-insoluble cellulose ether with a solution of an alkali hypochlorite, at a temperature of about 40° C., and at a pH between about 9 and 10.3.

3. The method of bleaching cellulose ethers which comprises treating an aqueous suspension of a water-insoluble cellulose ether with a solution of an alkali hypochlorite, at a temperature of about 60° C., and at a pH between about 9.3 and 10.3.

4. The method of bleaching cellulose ethers which comprises treating an aqueous suspension of a water-insoluble cellulose ether with a solution of an alkali hypochlorite, at a temperature of between about 70° and 80° C., and at a pH between about 10.5 and 11.8.

5. The method of bleaching cellulose ethers which comprises treating an aqueous suspension of water-insoluble ethyl cellulose with a solution of an alkali hypochlorite, at a temperature between about 40° and about 80° C., and at a pH between 9 and 11.8.

6. The method of bleaching cellulose ethers which comprises treating an aqueous suspension of water-insoluble ethyl cellulose with a solution of an alkali hypochlorite, at a temperature of about 40° C., and at a pH between about 9 and 10.3.

7. The method of bleaching cellulose ethers which comprises treating an aqueous suspension of water-insoluble ethyl cellulose with a solution of an alkali hypochlorite, at a temperature of about 60° C., and at a pH between about 9.3 and 10.3.

8. The method of bleaching cellulose ethers which comprises treating an aqueous suspension of water-insoluble ethyl cellulose with a solution of an alkali hypochlorite at a temperature of between about 70° and 80° C., and at a pH between about 10.5 and 11.8.

JAMES A. McHARD.
FLOYD C. PETERSON.